United States Patent [19]

Tsukagoshi

[11] Patent Number: 5,475,431
[45] Date of Patent: Dec. 12, 1995

[54] REAL-TIME ENCODING SIGNAL EXTRACTION AND DISPLAY APPARATUS

[75] Inventor: Ikuo Tsukagoshi, Tokyo, Japan

[73] Assignee: Sony Corporation, Tokyo, Japan

[21] Appl. No.: 81,170

[22] Filed: Jun. 25, 1993

[30] Foreign Application Priority Data

Jun. 30, 1992 [JP] Japan ..................... 4-196013

[51] Int. Cl.$^6$ .............. H04N 7/34; H04N 7/36; H04N 7/64
[52] U.S. Cl. ............ 348/402; 348/405; 348/409; 348/412; 348/699; 348/700
[58] Field of Search .................. 348/401, 402, 348/403, 412, 413, 414, 415, 422, 404, 405, 406, 407, 408, 409, 410, 411, 699, 700, 419, 420, 416

[56] References Cited

U.S. PATENT DOCUMENTS

| | | | |
|---|---|---|---|
| 4,694,329 | 9/1987 | Belmares-Sarabia et al. | 358/327 |
| 4,703,348 | 10/1987 | Yuasa et al. | 348/405 |
| 4,774,574 | 9/1988 | Daly et al. | 348/407 |
| 4,780,907 | 10/1988 | Speiser et al. | 358/327 |
| 4,823,184 | 4/1989 | Belmares-Sarabia et al. | 358/327 |
| 4,833,535 | 5/1989 | Ozeki et al. | 348/401 |
| 4,982,282 | 1/1991 | Saito et al. | 348/402 |
| 4,999,704 | 3/1991 | Ando | 348/406 |
| 5,014,915 | 5/1991 | Hirota et al. | 348/411 |
| 5,032,927 | 7/1991 | Watanabe et al. | 348/404 |
| 5,117,287 | 5/1992 | Koike et al. | 348/408 |
| 5,128,754 | 7/1992 | Dhein | 348/409 |
| 5,151,784 | 9/1992 | Lavagetto et al. | 348/419 |
| 5,164,828 | 11/1992 | Tahara et al. | 348/412 |
| 5,168,357 | 12/1992 | Kutka | 348/407 |
| 5,193,002 | 3/1993 | Guichard et al. | 348/419 |
| 5,212,549 | 5/1993 | Ng et al. | 348/409 |
| 5,227,877 | 7/1993 | Yukitake | 348/410 |
| 5,228,028 | 7/1993 | Cucchi et al. | 348/409 |
| 5,231,384 | 7/1993 | Kuriacose | 348/407 |
| 5,260,783 | 11/1993 | Dixit | 348/410 |
| 5,274,453 | 12/1993 | Maeda | 348/417 |
| 5,295,201 | 3/1994 | Yokohama | 348/411 |

*Primary Examiner*—Tommy P. Chin
*Assistant Examiner*—Anand S. Rao
*Attorney, Agent, or Firm*—William S. Frommer; Alvin Sinderbrand

[57] ABSTRACT

In a picture encoding apparatus, pieces of local encoded information generated at signal processing stages for predictive coding picture data are extracted in accordance with a selecting signal and displayed on a screen. A processing condition of the signal processing stages can thus be confirmed in real time, and a processing condition of the local encoded information according to a transmission picture can also be confirmed selectively and visually. Thus the time required for the examination and enhancement of the picture quality of a system can be shortened considerably.

3 Claims, 5 Drawing Sheets

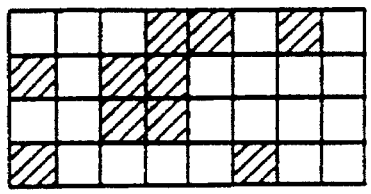
FIG. 3A
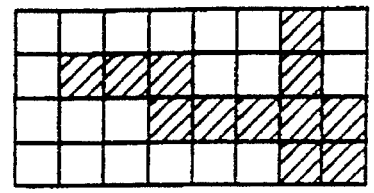
FIG. 3B
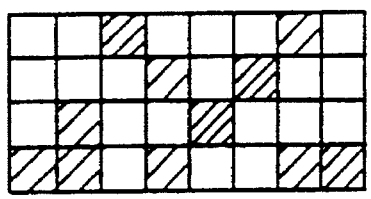
FIG. 3C
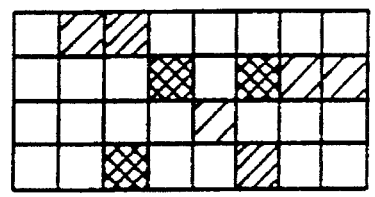
FIG. 3D
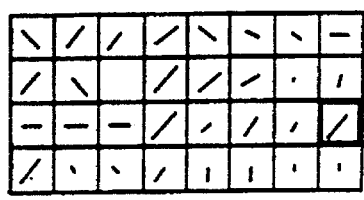
FIG. 3E
```
0 0 - - - - - 0
0 0           0
         0 0
        0 1 0
       0 1 0
      0 1 0
      1 0 0 - - - - - 0
```
FIG. 3F

REAL-TIME ENCODING SIGNAL EXTRACTION AND DISPLAY APPARATUS

BACKGROUND OF THE INVENTION

1. Field of the Invention

This invention relates to a picture encoding apparatus, and more particularly, is suitably applicable to a picture encoding apparatus for transmitting such pictures that a large quantity of information is generated in high efficiency encoding.

2. Description of the Related Art

In a prior art picture encoding apparatus of this kind, there has been such an arrangement that a motion vector of a picture to be transmitted is previously obtained to encode the picture signal, and then the picture to be transmitted is transformed according to the motion vector, thereby enhancing a transmission efficiency and a compression efficiency.

Here, it is conceived that the picture to be transmitted has generally a high correlativity between picture signals of two consecutive frames unless a scene change, therefore the quantity of information is compressed by obtaining a difference between picture data of the consecutive frames which is sequentially encoded thereafter.

With reference particularly to a portion of a moving picture, a quantity of information of the difference increases all the more if merely obtaining the interframe difference, therefore it is general that blocks of a previous frame are moved vertically and horizontally by a motion vector of the previous frame to be shifted in respective directions so that a block in which a quantity of information generated between each picture element of the previous frame and that of the present frame is minimized is obtained, thereby compressing the quantity of information.

Here, the picture encoding apparatus is arranged such that the previous frame is shifted in the directions x and y according to the motion vector of a previous block, so as to decide that a vector to the shifted block upon which the sum of difference absolute values of picture elements of the present block and the shifted block in all directions is minimized becomes the motion vector of the present block.

Meanwhile, in a case where such picture encoding apparatus is constructed, a simulation on a computer is widely utilized for appreciating a performance and effect of the system beforehand.

However, in many cases, there is required a so long time for the simulation to pictures, and particularly, in the case of pictures of a high precision TV broadcasting (or a so-called HDTV (High Definition TV)) in which a picture element of the picture to be processed is many in number, several hours are required for completing a picture processing by one second even using a supercomputer, thereby it is inconvenience to examine into the procedure.

Therefore, a method in which a hardware for exclusive use on simulation is designed, and picture information changing at real time is ensured thereon is employed in most cases. However, it is difficult to carry out an analysis of information extracted from among various items of information on the picture as required.

Accordingly, if such a circuit as is capable of confirming visually local information in picture encoding by a switch operation as in the case where the picture is observed on a monitor is realized, then a convenience will be ensured for examining into an improvement of quality of pictures and a construction of the system. Moreover, operation of each circuit can be accurately caught in manufacturing a hardware by way of trial, therefore a debugging efficiency is improved.

SUMMARY OF THE INVENTION

In view of the foregoing, an object of this invention is to provide a picture encoding apparatus in which it is capable of extracting and displaying at real time such information that which encoding method is used to encode each block within a picture information and it is local information of a picture such as a quantity of movement between blocks.

The foregoing object and other objects of the invention have been achieved by the provision of a picture encoding apparatus 1, wherein: picture data S1 is predictively transformed at every unit block into predictive encoding data, which is orthogonally transformed into coefficient data S8 to be variable-length-coded, thereby outputting the picture data with high efficiency coding; the picture encoding apparatus comprises a coded information selection means 13 for extracting plural pieces of local coded information S3, S4, S5, S6 and S7 indicating processing steps used when the picture data S1 has been predictively coded, in respective signal processing stages 3, 4 and 5, and for outputting the corresponding local coded information based on a selecting signal S12.

The coded information selection means 13 extracts the plural pieces of local coded information S3, S4, S5, S6 and S7 generated in the signal processing stages 3, 4 and 5 for predictively coding the picture data S1, and outputs only the local coded information corresponding to the selecting signal S12 to display on a screen thereof. Thus a processing condition of each part can be confirmed at real time, and a processing condition of the local encoded information according to a transmission picture can also be confirmed selectively and visually. Therefore the time required for examination into improvement of quality of pictures and construction of a system can be shortened remarkably.

According to the present invention, plural pieces of local coded information generated in respective signal processing stages for predictively coding picture data are extracted by coded information selecting means, and only such information as is selected from among the extracted local coded information is outputted, thus a processing condition at each signal processing stage can be confirmed at real time, and a processing condition of each part according to a picture to be transmitted can be confirmed selectively and also visually, therefore the time required for examination into enhancement of a quality of pictures and construction of a system can remarkably be shortened.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a schematic diagram using for illustration of a display screen of local information.

DETAILED DESCRIPTION OF THE EMBODIMENT

Preferred embodiments of this invention will be described with reference to the accompanying drawings:

(1) General construction of an Embodiment

Figure 1:
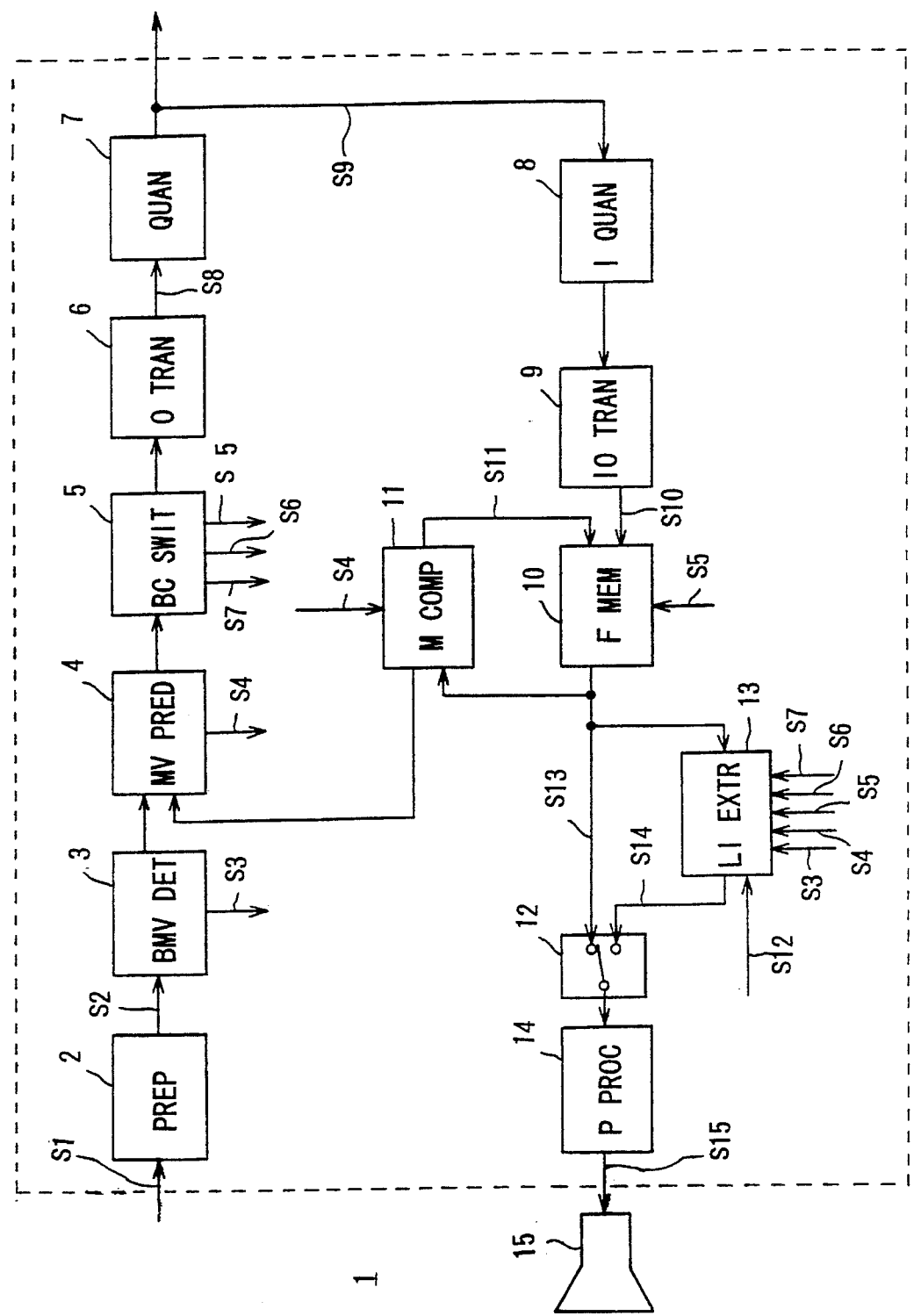
FIG. 1 is a block diagram representing a picture encoding apparatus of one embodiment of the present invention.

In FIG. 1, a reference numeral 1 denotes a picture encoding apparatus as a whole, in which a preprocessing circuit 2 converts an analog video signal S1 sequentially inputted into digital data by a matrix circuit and an analog/digital conversion circuit.

The preprocessing circuit 2 converts also the digital data inputted in correspondence to a horizontal scanning of a screen into block data S2 obtained by dividing the screen into a plurality of blocks, and outputs it to a block mean value detection circuit 3.

Here the block mean value detection circuit 3 obtains a direct current level within each block from block data S2 as a representative value of a picture element constructing each block, and outputs it as mean value data S3.

When the block data S2 is inputted to a motion vector predicting circuit 4 via the block mean value detection circuit 3, the picture encoding apparatus 1 obtains a motion vector by comparing it with data of previous frame which corresponds to the block data S2, and outputs it as a motion vector signal S4.

In this case, upon inputting the block data S2 from the motion vector predicting circuit 4, a block coding switching circuit 5 obtains a difference of picture data between present blocks and corresponding blocks of previous frame from the former by the motion vector, and selects one of the least block data in the absolute sum of difference between pixel values and a mean value within the block (that is, whichever smaller in a block power) in the difference data and the present block data, as that in which the information content is minimized, thus selecting an encoding mode of the picture data.

Thus the block mean value detection circuit 3, the motion vector predicting circuit 4 and the block coding switching circuit 5 are formed a signal conversion processing stage, in which the picture data is predictively coded at every unit block to converted thereof into a predictive coding data, and plural pieces of local coded information indicating processing steps when the picture data has been predictively coded.

In this connection, the selection of the residual block is to select an interframe coding processing, and the selection of the present frame is to select an intraframe coding processing.

The block coding switching circuit 5 outputs a selected result and the block power thereat as an interframe/intraframe coding selection flag S5 and a block power signal S6.

Additionally, the block coding switching circuit 5 estimates a motion speed (either quick or slow) by utilizing a motion vector MV obtained from the motion vector predicting circuit 4, and outputs it as a speed flag S7.

Thereafter, the picture encoding apparatus 1 transforms the block selected in an orthogonal transform circuit 6 into coefficient data by an orthogonal transform processing according to a discrete cosine transform, quantizes and variable length codes the coefficient data S8 in a quantization circuit 7 and then outputs the data variable length coded to receiving apparatus (not shown in FIG. 1).

In this connection, an arrangement is such that the quantization circuit 7 determines a quantized step size corresponding to a characteristic distinction of local situation in the picture based on the interframe/intraframe coding selection flag S5, the block power signal S6 and the speed flag S7 obtained from the block coding switching circuit 5.

In this embodiment, the quantization circuit 7 includes a variable length coding circuit to output the transmitting data after variable length coding processed.

The picture encoding apparatus 1 has a local decoding circuit arrangement, and thus a picture to be transmitted can be confirmed on the encoding side.

That is, when data S9 quantized by the quantization circuit 7 is inputted to an inverse quantization circuit 8, the picture encoding apparatus 1 subjects it to a power conversion based on the interframe/intraframe encoding selection flag S5, the block power signal S6 and the speed flag S7 used for adaptive quantization in the quantization circuit 7, and then supplies local decoded data S10 to a frame memory 10 in inversely processing to the discrete cosine transform at an ensuing inverse orthogonal transform circuit 9.

In this case, the frame memory 10 discriminates whether or not the local decoded data S10 decoded with power conversion is added to data of the previous frame existing within the frame based on the interframe/intraframe encoding selection flag S5.

Here, in case where the corresponding block is interframe coded data, the picture encoding apparatus 1 modifies a read address of the block data read out of the frame memory 10 according to the motion vector signal S4, adds motion compensated data S11 to the local decoded data S10 (namely reproduced residual block data), and supplies to a switching circuit 12 and a local information extraction circuit 13 forming a coded information selection means.

In the case of this embodiment, an arrangement is such that the mean value data S3, the motion vector signal S4, the interframe/intraframe coding selection flag S5, the block power signal S6 and the speed flag S7 are inputted to the local information extraction circuit 13 from the block mean value detection circuit 3, the motion vector predicting circuit 4, and the block coding switching circuit 5 each, local information of each part selected by a user according to a selecting signal S12 is extracted and outputted to a postprocessing circuit 14. The switch 12 selects the signal S14 selected at the local information extraction circuit and the picture data S13 outputted from the frame memory.

Here, when the frame data inputted at every block is converted into a line sequential scanning line signal, the postprocessing circuit 14 subjects the scanning line signal to a digital-to-analog conversion to output to a monitor as a decoded analog video signal S15.

(2) Construction of Local Information Extraction Circuit 13

Figure 2:
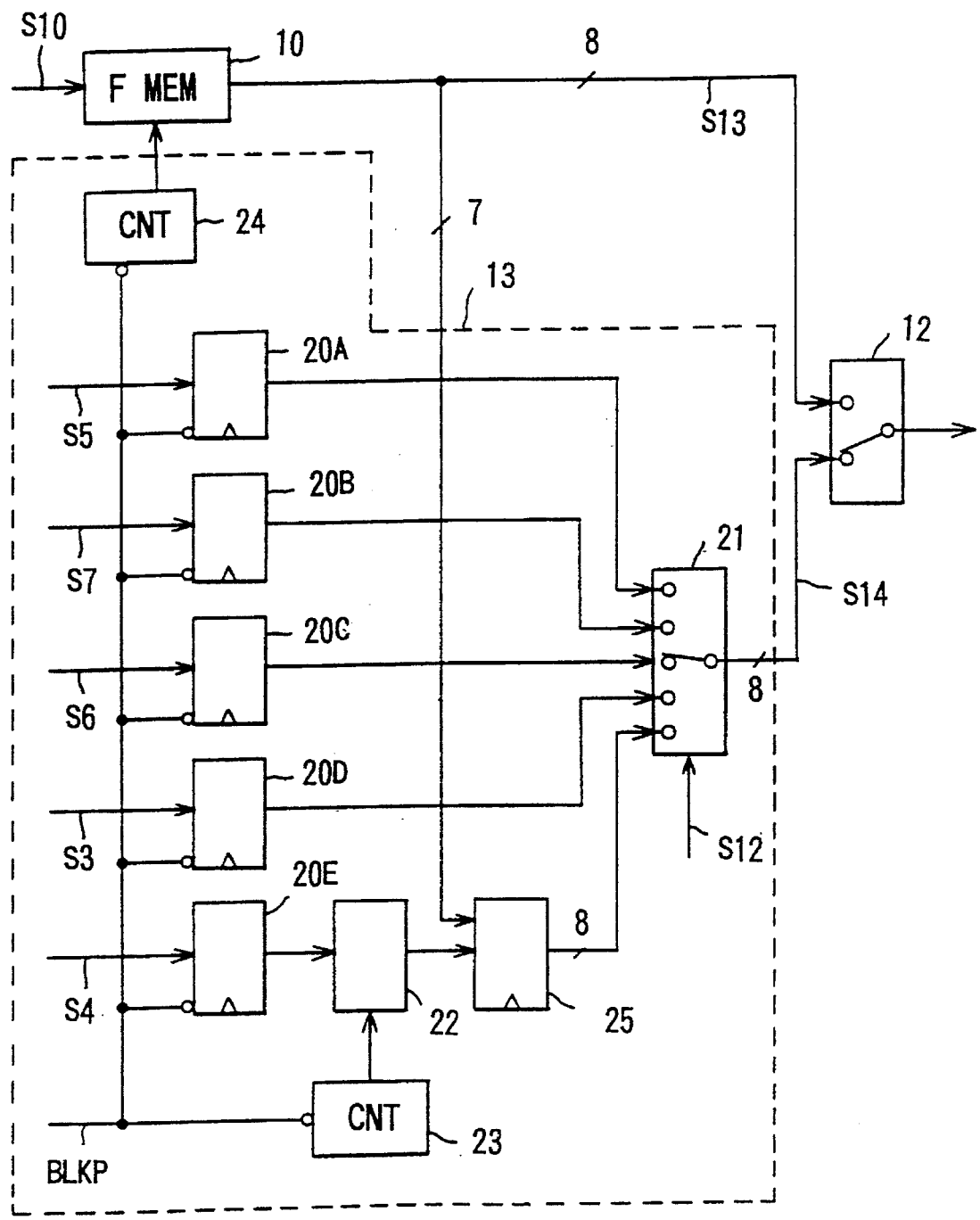
FIG. 2 is a block diagram showing a local information extraction circuit thereof.

Here, as shown in FIG. 2, the local information extraction circuit 13 loads to retain the interframe/intraframe coding selection flag S5, the speed flag S7, the block power signal S6, the mean value data S3, and the motion vector signal S4 corresponding to various items of adaptive information (interframe/intraframe encoded information (intra/inter), motion speed information (fast/slow), block residual information (block power), block means value information (intra DC), and motion vector information (MV)) in latch circuits 20A, 20B, 20C, 20D and 20E respectively in the timing of a block pulse BLKP, thus outputting these to an output switching circuit 21 sequentially.

In this case, an arrangement is such that the latch circuit 20E holding the motion vector (MV) latches an x component and a y component of the motion vector, and supplies the x component and the y component to a read-only memory 22 in which a plurality of tables with a block size (8 picture elements×8 picture elements) are stored as upper addresses.

In this connection, if the upper bit addresses of the x component and the y component exceeds an address range of the read-only memory 22, the read-only memory 22 can set upper limits for the x and y components to allow the same to enter within the address range.

On the other hand, the read-only memory 22 receives an output of an address generation counter 23 for generating an address of 8 picture elements×8 picture elements by an input of the block pulse BLKP allowing data to be latched once per block as a lower address, and a pattern of vectors is read out sequentially by the counter while the vector of the next block is set.

In this case, data outputted from the read-only memory 22 has a linear pattern as one-bit vector, so that the local information extraction circuit 13 superposes the data, which is the most significant bit of 8-bit picture data outputted from the frame memory 10, on picture data at a multiplexer 25 and then outputs it to the output switching circuit 21, thereby facilitating appreciation to be done thereafter.

The block pulse BLKP is also inputted to the latch circuits 20A to 20E and an address generation circuit 24 to read picture data stored in the frame memory 10 according to an address inputted from the address generation circuit 24.

(3) Operation and Advantage of Embodiment

In the above-described construction, the picture encoding apparatus 1 converts the inputted analog video signal S1 in sequence with high efficiency encoding into block data, which is transformed with an orthogonal transform processing thereafter, which is then quantized to output coefficient data.

For confirming a transmission picture outputted to the processing circuit at the post stage of the encoding side, the picture encoding apparatus 1 displays the quantized data S9 on the monitor 15 via a local decoding system (namely the inverse quantization circuit 8, the inverse orthogonal transform circuit 9, the frame memory 10, and the postprocessing circuit 14).

If a condition of such encoding process on each part is to be confirmed, a user operates a switch to input the selecting signal S12 to the local information extraction circuit 13, selects to output local information to be confirmed from the output switching circuit 21, and displays it, by such as a shade of color or luminance, on a monitor through the postprocessing circuit 14.

In a case, for example, where it is desirous to confirm which coding method of interframe and intraframe encoding processing has been utilized in predictively coding each blocks of picture to be transmitted, the local information extraction circuit 13 displays on the monitor, as shown in FIG. 3A, the interframe/intraframe encoding selection flag S5 inputted from the block encoding switching circuit 5 according to the selecting signal S12, through the postprocessing circuit 14. Thus the user can easily confirm which portion of the picture has been subjected to the interframe encoding and the in-frame encoding on a screen at real time.

Similarly, the motion speed information (a fast moving block being indicated in black in this embodiment), the residual information of each block, and the block mean value information are displayed on the screen, as shown in FIGS. 3B, 3C and 3D thus a processing condition to the picture of each block can easily be confirmed.

Further, if the motion vector MV of each block is to be confirmed, the local information extraction circuit 13 generates data coincident with a feed order of the residual information in the read-only memory 22, and displays it on the screen as shown in FIG. 3E.

If a vector diagram indicating direction and magnitude of the motion vector MV is enlarged, then direction and magnitude of the motion vector MV can be indicated by direction and length of the logic "1" in each block as shown in FIG. 3F, and thus the user can easily confirm visually the picture of each block and the direction and magnitude of the motion vector thereof.

According to the above-described construction, the picture encoding apparatus 1 is provided with the local information extraction circuit 13 for selecting to output the mean value data S3 indicating a processing condition of each part and a characteristic of the processed picture at the time when the picture is predictively coded in the local decoding system, the motion vector signal S4, the interframe/intraframe coding selection flag S5, the block power signal S6 and the speed flag S7, and with indicating a processing condition of each part on a screen at real time by the local information extraction circuit 13, an encoding processing appropriate to a local pattern can be examined quickly, and the time required for constructing the system and improving in quality of pictures can be remarkably shortened.

Figure 4A:
FIGS. 4 and 5 are schematic views showing examples of picture to be processed.
Figure 4B:
Figure 4C:
Figure 4D:
Figure 5A:
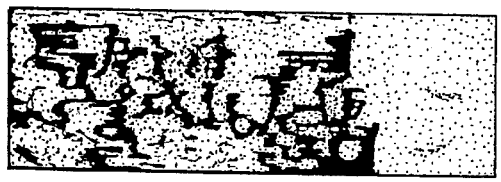
Figure 5B:
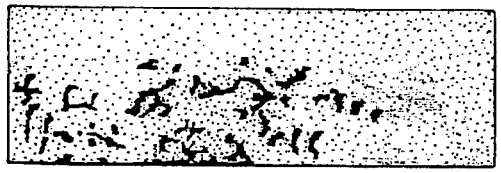
Figure 5C:
Figure 5D:
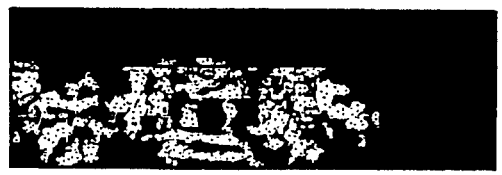

FIGS. 4A to 4D and 5A to 5D illustrate two picture data subjected into coding processing in successive processing steps. FIGS. 4A and 5A are original pictures. FIGS. 4B and 5B are first picture data for motion speeds, FIGS. 4C and 5C are second picture data for block mean values (in this case, picked up skin color portion in the original picture), and FIGS. 4D and 5D are third picture data for block residual powers.

(4) Other Embodiments

In the above-described embodiment, interframe/intraframe encoded information, motion speed information, residual information of a block from the previous block, block mean value and motion vector are selected as local information. However, the present invention is not only limited to this but also other local information such as flatness of a pattern may be selected.

Additionally, in the above-described embodiment, a block power is obtained by getting the sum of difference absolute values within a block. However, the present invention is not only limited to this but also it may be obtained by getting the square sum.

Further in the above-described embodiment, each block is constructed of 8 picture elements horizontally and .vertically. However, the present invention is not only limited to this but also is applicable to a block constructed of picture elements given in another number.

Still further, in the above-described embodiment, the present invention is applied for confirmation of processing condition and characteristics of picture to be processed. However, the present invention is not only limited to this, but also is applicable to a recognition process of still or motion pictures, since the processing condition of pictures can be extracted in parallel with a signal processing.

While there has been described in connection with the referred embodiments of the invention, it will be obvious those skilled in the art that various changes and modifications may be aimed, therefore, to cover in the appended claims all such changes and modifications as fall within the true spirit and scope of the invention.

What is claimed is:

1. A picture encoding-decoding apparatus comprising:

a preprocessing circuit for converting an input analog video signal into a digital signal, and dividing said digital signal into a plurality of blocks to form a block data signal;

a block mean value detecting circuit for outputting a mean value data signal dependent on a direct current level in each block from said block data signal;

a motion vector predictive coding circuit for calculating a motion vector from said block data signal and for outputting a motion vector signal;

a block coded switching circuit responsive to said block data signal and said motion vector signal, for selecting an encoding process so as to reduce a block power, and then outputting an intra/inter selecting flag, a block power signal, and a speed flag;

an orthogonal transform circuit responsive to said block coded switching circuit for producing coefficient data;

a quantization circuit for quantizing said coefficient data and producing a transmit data signal; and a local decoding circuit arrangement for decoding said transmit data signal comprising:

an inverse quantization circuit for inverse quantizing said transmit data signal;

an inverse orthogonal transform circuit responsive to said inverse quantization circuit for inverse orthogonal transforming data and for outputting a local decoded data signal;

a memory portion for receiving and processing said local decoded data signal, responsive to said intra/inter selecting flag and said motion vector signal; and a postprocessing circuit responsive to said memory portion for outputting an output analog video signal, comprising:

a local information extracting circuit responsive to a selecting signal for selecting among said mean value data signal, said motion vector signal, said intra/inter selecting flag, said block power signal and said speed flag, and for outputting a local information signal; and a switching circuit for selecting either the output of said local information extracting circuit or the output of said memory portion; and a display monitor for displaying the output analog video signal from said postprocessing circuit.

2. An encoding signal extraction and display apparatus comprising:

encoding means for encoding an input video data signal and for producing a coded video data signal and a plurality of intermediate encoding signals wherein said coded video data signal comprises a predictive encoding of said input video data signal produced by subjecting said input video data signal to a plurality of successive encoding operations, each encoding operation producing at least one operation result signal, and wherein each of said intermediate encoding signals is comprised of a respective one of said operation result signals;

decoding means, responsive to said encoding means, for decoding said coded video data signal and for producing a decoded video data signal;

selecting means, coupled to said encoding means and said decoding means, for selecting among one of said intermediate encoding signals and said decoded video data signal, and for producing a selected signal; and means, responsive to said selecting means, for visually displaying said selected signal.

3. The apparatus according to claim 2, wherein said selecting means comprises means for processing at least one of said intermediate encoding signals.

* * * * *